(12) United States Patent
Walton

(10) Patent No.: US 11,691,680 B2
(45) Date of Patent: Jul. 4, 2023

(54) TRAILER DOLLY APPARATUS

(71) Applicant: Randal D Walton, Chubbuck, ID (US)

(72) Inventor: Randal D Walton, Chubbuck, ID (US)

(*) Notice: Subject to any disclaimer, the term of this patent is extended or adjusted under 35 U.S.C. 154(b) by 363 days.

(21) Appl. No.: 16/941,110

(22) Filed: Sep. 28, 2020

(65) Prior Publication Data

US 2022/0097782 A1   Mar. 31, 2022

(51) Int. Cl.
*B62D 53/08* (2006.01)
*B62D 63/06* (2006.01)
*B60D 1/07* (2006.01)

(52) U.S. Cl.
CPC ......... *B62D 53/0864* (2013.01); *B60D 1/075* (2013.01); *B62D 63/065* (2013.01)

(58) Field of Classification Search
CPC ... B62D 53/0864; B62D 63/065; B60D 1/075
See application file for complete search history.

(56) References Cited

U.S. PATENT DOCUMENTS

| | | | | |
|---|---|---|---|---|
| 3,476,405 A | * | 11/1969 | Cunha | B60P 7/13 280/80.1 |
| 4,759,563 A | * | 7/1988 | Nash | B62D 53/0864 414/362 |
| 4,768,802 A | * | 9/1988 | Winkler | B62D 53/0864 280/81.6 |
| 4,856,804 A | * | 8/1989 | Nash | B62D 53/0864 280/441 |
| 5,098,115 A | * | 3/1992 | Haire | B62D 53/0864 280/901 |
| 5,280,939 A | * | 1/1994 | Kee | B62D 53/0864 280/411.1 |
| 5,338,050 A | * | 8/1994 | Haire | B62D 53/0864 280/476.1 |
| 5,348,332 A | * | 9/1994 | Hamilton | B60D 3/00 280/416.2 |
| 5,407,221 A | * | 4/1995 | Haire | B62D 53/0864 280/901 |

(Continued)

*Primary Examiner* — Minnah L Seoh
*Assistant Examiner* — Michael R Stabley

(57) ABSTRACT

A load-bearing trailer dolly which connects a tongue-type boat, utility or other trailer to a towing tandem trailer and bears weight from the trailer during towing. In a preferred embodiment, the trailer dolly is characterized by an axle mounted on a pair of wheels. A dolly frame height-adjustable trailer hitch centered coaxial above the axle axis and midway point framed dolly plate mount by operation of an adjustable sleeve reducer fastened by pinning and lock. Includes dual connecting adjustable height tongues for attachment to rear end trailer hitches on the tandem towing trailer at which a pair of hitch fasteners for engaging the trailer dolly tongues are attached to the rear of the tandem trailer. The adjustable tongue hitches on trailer dolly will give ability to horizontal level tandem dolly. A shock-absorbing spring is fitted between the axle mount and the dolly frame for cushioning the dolly frame on the axle mount as the trailer is towed behind the towing tandem trailer. In the industry of dollies, the car dolly has no shock-absorbing function, just square axle with hubs for wheels, axle is attached to car dolly frame. There is an option with shock-absorbing mechanism or s non shock-absorbing option.

18 Claims, 9 Drawing Sheets

(56) References Cited

U.S. PATENT DOCUMENTS

| | | | | |
|---|---|---|---|---|
| 5,924,716 | A * | 7/1999 | Burkhart, Sr. | B62D 53/0864 |
| | | | | 280/476.1 |
| 6,056,309 | A * | 5/2000 | Brown | B60D 1/07 |
| | | | | 280/447 |
| 6,273,447 | B1 * | 8/2001 | Vande Berg | B60D 1/167 |
| | | | | 280/476.1 |
| 6,290,248 | B1 * | 9/2001 | Yrigoyen | B60D 1/07 |
| | | | | 280/460.1 |
| 6,419,037 | B1 * | 7/2002 | Kramer | B62D 53/005 |
| | | | | 180/14.2 |
| 6,820,887 | B1 * | 11/2004 | Riggle | B62D 53/0864 |
| | | | | 280/490.1 |
| 7,823,902 | B2 * | 11/2010 | Jamieson | B60D 1/06 |
| | | | | 280/460.1 |
| 7,934,743 | B1 * | 5/2011 | Wall | B60D 1/46 |
| | | | | 280/476.1 |
| 8,794,656 | B2 * | 8/2014 | West | B62D 53/0864 |
| | | | | 280/479.2 |
| 8,820,443 | B2 * | 9/2014 | Ferri | B60D 1/665 |
| | | | | 180/14.2 |
| 8,919,802 | B2 * | 12/2014 | Knight | B60D 1/665 |
| | | | | 280/476.1 |
| 9,126,644 | B2 * | 9/2015 | Banwart | B62D 53/0842 |
| 9,676,239 | B1 * | 6/2017 | Lusty | B62D 53/00 |
| 10,449,954 | B2 * | 10/2019 | Layfield | B60L 50/64 |

* cited by examiner

TRAILER DOLLY APPARATUS

CROSS-REFERENCE TO RELATED APPLICATIONS

United States Patent U.S. Pat. No. 3,865,405A/1975 inventors Stanley W. Mitchell and Edward N. Spenchuk, United States Patent U.S. Pat. No. 2,592,219A/1952 inventors Leonard R West and Overby B Sterett, United States Patent U.S. Pat. No. 6,681,535B1/2004 inventor Ty Batchelor, United States Patent U.S. Pat. No. 6,685,211B2/2004 inventor Arthur R. Iles, United States Patent U.S. Pat. No. 2,450,215A/1948 Inventor William A Wilson, United States Patent U.S. Pat. No. 6,820,887B1/2004 Inventor Robert E. Riggle, and United States Patent U.S. Pat. No. 3,421,777A/1969 Inventors Stephen Barker, Paul F Bennett.

FIELD OF THE INVENTION

The instant invention may be considered in the field of tandem-trailers trucked triple, can be exceptionally long consisting of a truck or SUV pulling two trailers hooked up tandem. Where a trailer dolly apparatus is used to support the weight of the last trailer that attaches to the other tandem trailer supporting the weight on the dolly not the tandem trailers rear end hitches. Not exceeding light tongue ball and hitch to truck or SUV will cause a more harmonious outcome.

BACKGROUND OF INVENTION

There is a need in the industry of trailer dollies. Larger trailers, typically fifth wheels, are heavy and can attach another trailer in tandem in a triple configuration of two trailers and a towing vehicle. The lighter ball-mount hitch trailer should not try to haul in tandem unless the second tail trailer is small and light.

Trailer dollies are patented for supporting the tongue-weight of a trailer while being towed. The connecting means of the towed trailer is behind the towing vehicle not designed for triple towing (U.S. Pat. No. 3,865,405A/1975 Mitchell et al., U.S. Pat. No. 2,592,219A/1952 West et al., U.S. Pat. No. 6,681,535B1/2004 Ty Batchelor, U.S. Pat. No. 6,685,211 B2/2004 Inventor Arthur R. Iles, U.S. Pat. No. 2,450,215A/1948 Inventor William A Wilson, and U.S. Pat. No. 6,820,887B1/2004 Inventor Robert E. Riggle).

A dolly for semitrailers has been patented. This transportation dolly is mainly used to improve the connection of two semitrailers in tandem. This type of apparatus assists in distributing the tongue weight of the last semitrailer onto the support dolly not applying forces to the other tandem semitrailer (U.S. Pat. No. 3,421,777A/1969 Inventor Barker et al.).

Situations, where the trailer reaches its gross trailer weight is when the weight of a trailer is fully loaded at maximum capacity. This condition causes increase trailer tongue weight that can weigh as much as 3,000 pounds. Tongue weights of this magnitude can unsafely overload the weight capacity of the camper trailers rear end when traveling. An increased load as much as 3,000 pounds, for example, a tandem trailer tongue hitch without dolly attached at rear end of the travel trailer frame will have problems traveling through bumps, potholes, bridges, and similar occurrences during travel which can damage the frame, chassis, and/or body of the trail trailer. An unsafe condition for the towing vehicle.

Other issues happen when the tandem trailer is towed in a position that is not horizontal with respect to the road. This produces unsafe forces on the tandem trailer tongue and hitch during towing that is not designed to safely support under tow.

Accordingly, what is needed is a dolly for towing tandem trailers that overcomes the frame, chassis, and/or body damage to towed trailers, the horizontal alignment of the trailer, and the steering drawbacks of conventional modes of towing dual trailers being two trailers and a vehicle.

The proposed patent application differs in that the trailer dolly is used primarily behind the travel trailer in a tandem triple towing configuration and is used to support the tongue weight of the last trailer. This tandem towing can be accomplished without a commercial driver's license (CDL) or class A license.

SUMMARY OF THE INVENTION

Regarding triple towing, fifth wheel trailers come with a tow hitch sleeve at rear of the trailer for towing tandem trailers. The problem is some fifth wheeler trailers are too long to legally tow tandem trailers. Trailers are allowed up to 45 feet maximum length. Fifth wheels trailers range from 25-45 feet. Maximum length of the towing vehicle and trailers combined is 65 feet with a basic class C license. Maximum length of the towing vehicle and trailers combined is 75 feet with a commercial class A license. With a 45 feet fifth wheel trailer towed by a typical class C license truck range 17-20 feet in length, the maximum legal length of 65 feet approximately happens with not option for tandem towing with a basic class C license, and with a class A license the recreational trailers can be no more then 10-13 feet in length.

The average travel trailer or a camper trailer are around 20 feet in length and 8 feet in width. Travel trailers need a towing truck or a SUV depending on the size and weight of the trailer. This type of trailer is generally tongue and ball hitch attachment. These type of camper trailers do not come with a towing sleeve attachment mounted at the rear of the trailer for tandem or triple towing due to up lift. This inventions niche in the market hovers within these average camper trailers. A 20 feet truck or SUV attached to a 20 feet camper trailer can haul 25 feet more in tandem triple towing and be within the maximum limits for basic class C drivers. The trailer dolly subtracts about 2 feet from the 25 feet giving the vacationer a total of 23 feet for a recreation vehicle (RV) trailer. The problem with a 23 feet boat and trailer can be heavy at the tongue hitch causing sway of the camper trailer tongue hitch.

Many vacationers tow triple tandem trailers with fifth wheel trailers that are heavy most ranging 7,000-20,000 pounds depending on the trailer length. Towing in triple with an additional tandem RV trailer is no problem for this type of trailer. Camper trailers with ball-mounted hitch weights range between 1,550 pounds for a 13 feet trailer to 6,600 pounds for a 35 feet camper trailer.

Trailers with ball-mounted hitches should have tongue weight that is between 10-15% of the total trailer weight. Example, a 3,000-pound ball-mounted hitch trailer is loaded with 2,000 pounds of cargo, the proper tongue weight of the loaded trailer should be between 500 and 750 pounds.

When the tongue of the trailer does not have enough downward weight on the towing vehicle's ball mount hitch, the trailer's tongue weight is extremely light. Too light of a ball mount tongue and hitch causes a dangerous condition called trailer sway. When the tongue weight is extremely heavy, the steering of the towing vehicle is affected.

The typical ski boat weighs about 3,500 pounds plus trailer weight of 1,000 pounds, speed boats weigh around 8,000 pounds with trailer weight of 1,300 pounds, and cabin cruisers weigh about 8,700 pounds add another 1,600 pounds of trailer weight totaling 10,300 for the cabin cruiser on its trailer. Example, the cabin cruiser tongue weight is between 1,030 to 1,545 pounds. Example, a 22 feet camper trailer weighs 3,600 pounds with tongue weight between 360 to 540 pounds is hauling in tandem a cabin cruiser boat and trailer triple tow by a truck. Clearly the weight of the last trailer of cabin cruiser boat and trailer is going to cause trailer sway.

DETAILED DESCRIPTION OF THE INVENTION

The materials in manufacturing the tandem trailer dolly apparatus are steel, rubber tires, grease for the hubs, and wheels. The fastening means will be welding, clipping, pinning, capping, and bolting the materials together, or all five attaching ways combined.

Figure 1:
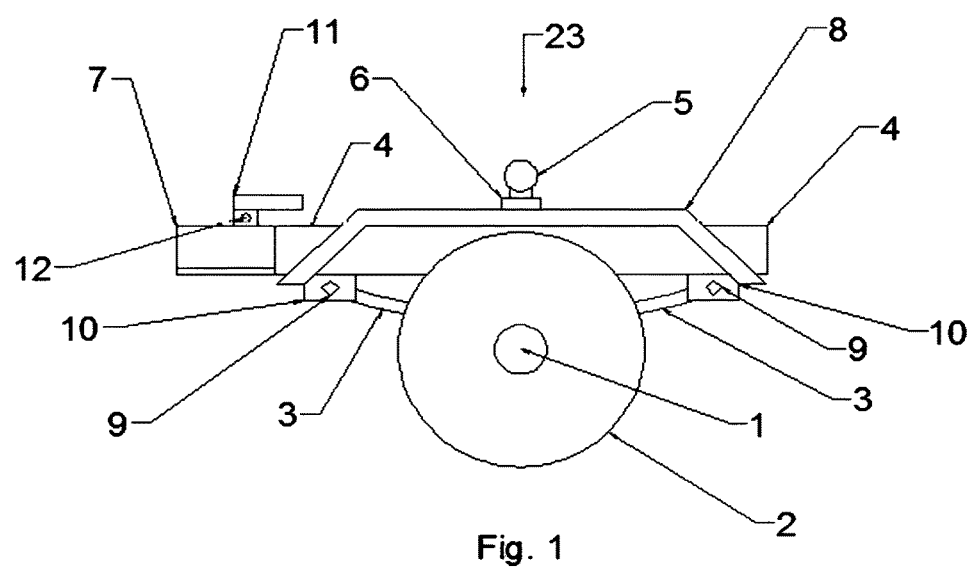
FIG. 1 is a side view of the embodiment showing the tandem trailer dolly apparatus. This apparatus primary use is hitched to the rear of the trailer being towed by the vehicle where tandem trailer weight is supported on the dolly. The ball hitch adjusts up and down for horizontal leveling of tandem trailer. A shock-absorbing system to cushion from bumps.

As seen in FIG. 1, a tandem trailer dolly embodiment 23 comprises an axial 1 for wheels 2, leaf spring suspension 3 with bracket 10 and U-bolt 9 with nuts to hold the leaf springs in place is provided to cushion the shock of potholes and bridges etc. A frame 4 made of steel. A ball hitch 5 to hitch the tongue of a tandem trailer has a trailer hitch sleeve for adjustable hitch slides up and down. The ball mount 6 is screw or weld the ball hitch 5 on adjustable hitch. The adjustable hitch has cylindrical holes for height adjustment and is static when pinned. The adjustable hitch is for horizontal leveling of tail end tandem trailer. The trailer hitch tongues 7, latches 11, and pins 12 are provided to secure the dolly 23 with no side to side turning ability only swivel up and down. Fenders 8 are provided to protect from projectiles striking tandem trailer.

Figure 2:
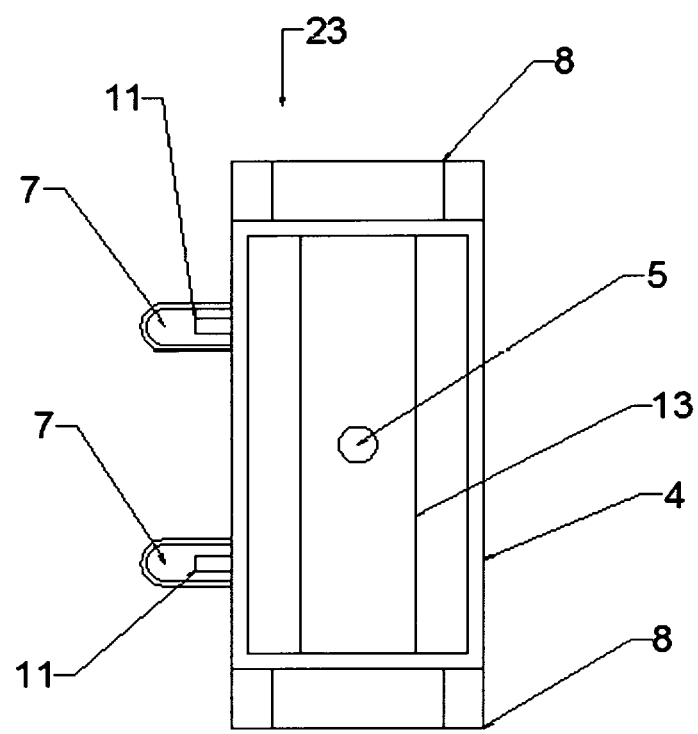
FIG. 2 is a top view of the embodiment showing the tandem trailer dolly apparatus has two tongue hitches. The ball hitch is coaxial with the axle and at the midway point of the trailer. A steel plate supports the weight of the adjustable ball hitch.

FIG. 2 discloses the embodiment 23, which has a steel plate 13 for structural stability of trailer dolly 23 frame 4 and fastens the ball hitch 5 in place. A view of the dual tongue hitches 7 and latches 11 are provided. The fenders 8 are seen.

Figure 3:
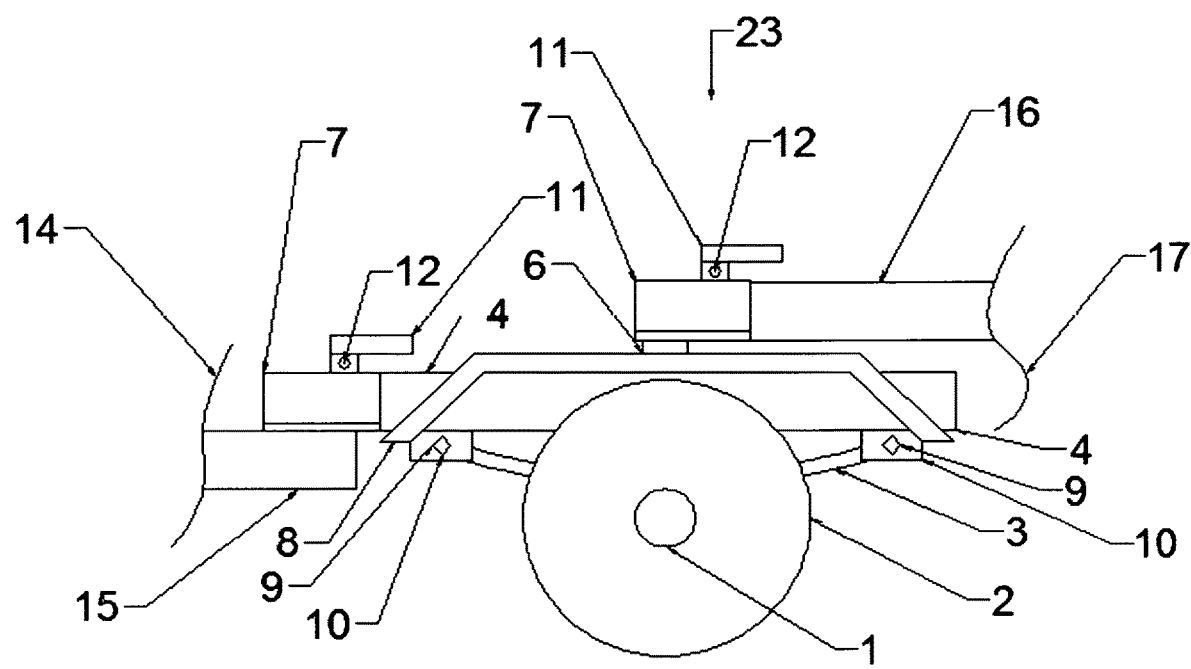
FIG. 3 is a side view of the embodiment showing the tandem trailer dolly apparatus connect by tongue and hitch method to the adjoining tandem trailers rear and the last trailer attaches by means of ball hitch centered on top of trailer dolly apparatus, said tongue weight from last trailer causes a downward force through the dolly center to the ground.

FIG. 3 discloses embodiment 23, tandem trailer dolly 23 being towed by trailer 14 is towed tandem with trailer 17, showing trailer 17 tongue 16 latch 12 swivels side to side on ball 5, ball hitch mount 6 and hitch 7. All of embodiment 23, primary trailer 14, and tandem trailer dolly 23 assisting secondary trailer 17 are in triple tandem towing, towing vehicle not seen in diagram. Adjustable ball hitch sleeve 6 is for horizontal leveling.

Figure 4:
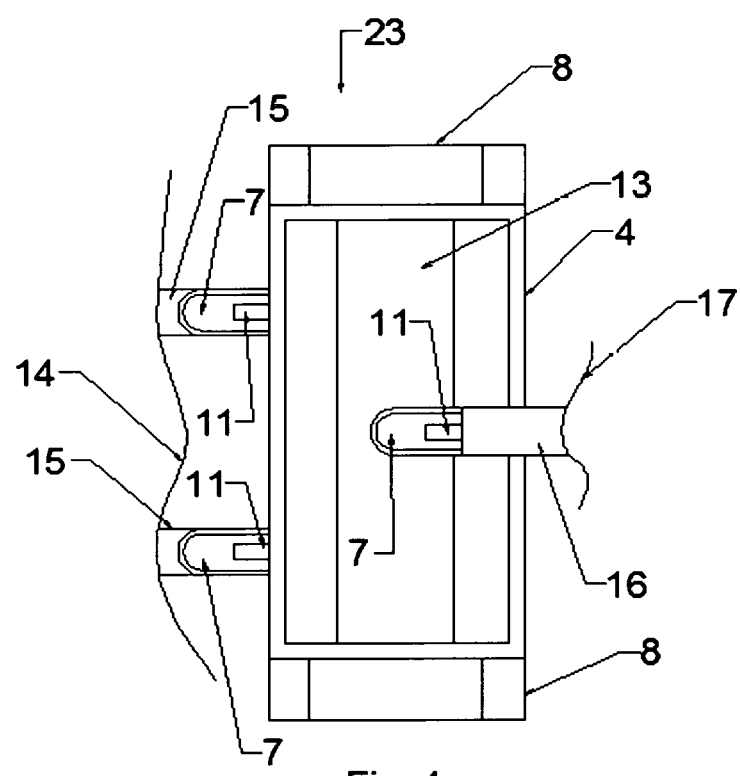
FIG. 4 is a top view of the embodiment showing the tandem trailer dolly apparatus has no turning capabilities fixing the hitch attachments to the rear of adjoining trailer with up and down swivel functions. The last trailer tongue and ball hitch of the triple towing tandem trailers can swivel side to side and up and down.

FIG. 4 discloses embodiment 23, that has no pivotal side to side abilities at tongue hitches 7 only up and down motion that is attached to trailer hitches 15 at the rear of trailer 14. That tandem trailer 17 is attached through ball hitch to tongue hitch 7 of trailer 17 can pivot side to side or up and down.

Figure 5:
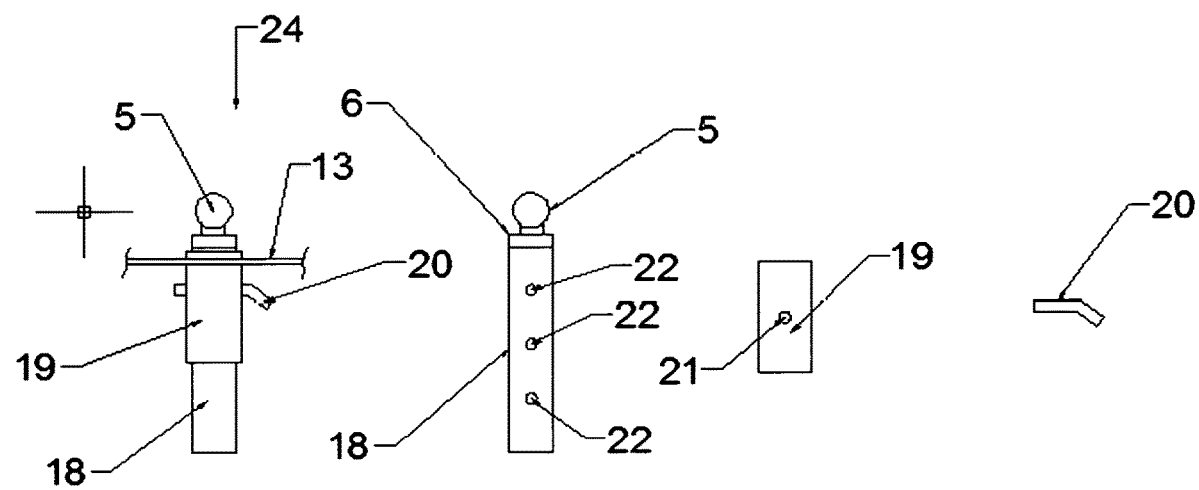
FIG. 5 is a side view of the embodiments ball hitch mechanism with adjustable height in sleeve and fastener pin. That adjustable ball hitch centers coaxial with the axle and at the midway point, measured midpoint from right side to left side intersecting coaxial line with midway ling of the trailer.

FIG. 5 discloses embodiment 24, with ball 5 and hitch 18 is adjustable with cylindrical holes 22 for pinning 20. A hitch sleeve 19 welded to plate 13 provide the framework to hold ball 5 hitch 18 in place under towing conditions.

Figure 6:
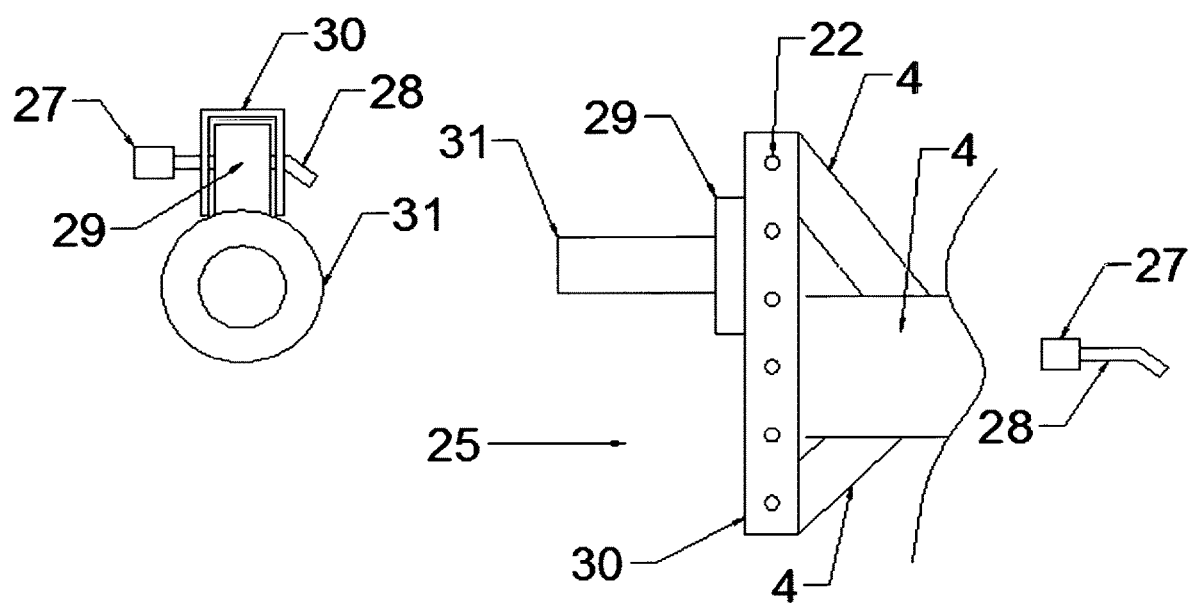
FIG. 6 is a side and top view of the embodiments pintle hook towing receiver that has an adjustable trailer hitch. The adjustable trailer hitch has holes for pinning through towing receiver cylindrical holes. The pins have a locking mechanism. The adjustable trailer hitch is welded or bolted into the dolly frame.

FIG. 6 discloses embodiment 25, shows towing receiver 31 with steel square formed 29 for pinning 28, towing receiver is all one piece 31 and 29. There are two pins 28 with locks 27 for pinning 28 and locking 27 towing receiver 31 to adjustable trailer hitch 30 through holes 22. The adjustable trailer hitch 30 is framed 4 into tandem trailer dolly 25.

Figure 7:
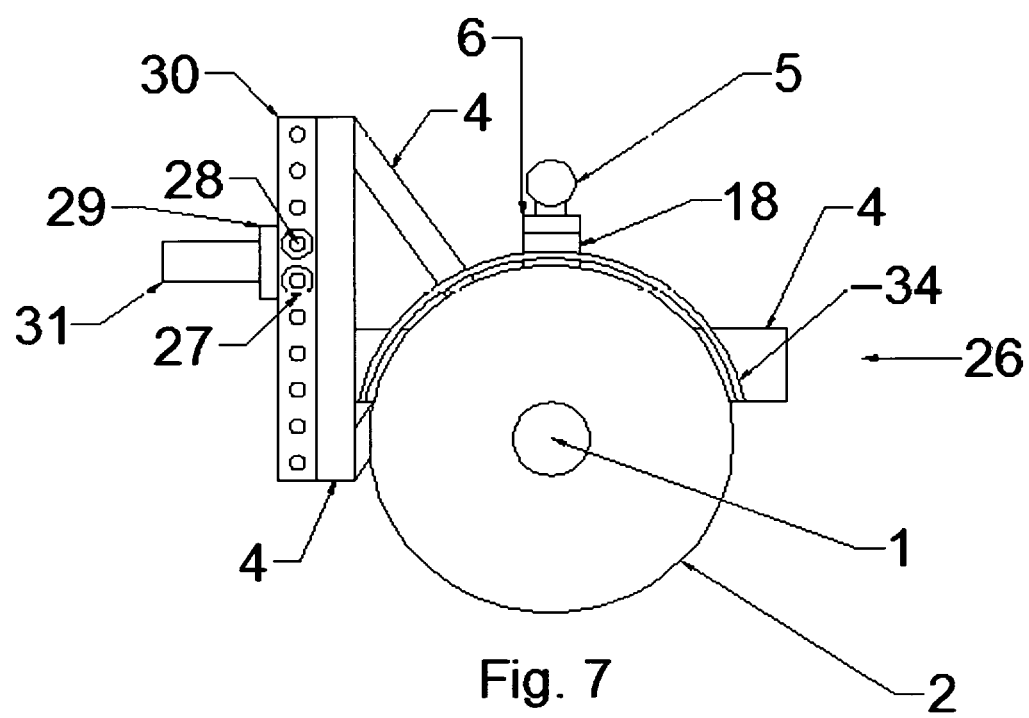
FIG. 7 is a side view of the embodiments tandem trailer dolly apparatus with no shock-absorbing system. The axle is attached to the dolly frame by welding or-bolting. Hubs for wheels attach to the axle. Fenders are provided to stop wheel projectiles. The ball hitch is adjustable up and down. The tongue towing receivers adjust up and down through the adjustable trailer hitches for horizontal leveling of dolly. Two pins have locking ends through the towing receivers and adjustable trailer hitches.

FIG. 7 discloses embodiment 26, that shows this tandem trailer dolly 26 has adjustable trailer hitch 30 and towing receiver 31 to line up primary trailer horizontal level. The ball hitch 5 attached by ball mount 6 is either screwed or welded to adjustable hitch 18. The adjustable ball 5 and hitch 18 are for horizontal leveling of rear tandem trailer. There is additional framing 4 to dolly 26 frame 4 securing adjustable hitch 30 that holds towing receiver 31 by means of pins 28 with locks 27. The towing receiver 31 and adjustable hitch 30 is for horizontal leveling of tandem trailer dolly 26. The axle 1 is attached directly to frame 4 by welding or U-bolts. The wheels 2 have fenders 34 to stop projectiles when wheels 2 contact lose debris on the road.

Figure 8:
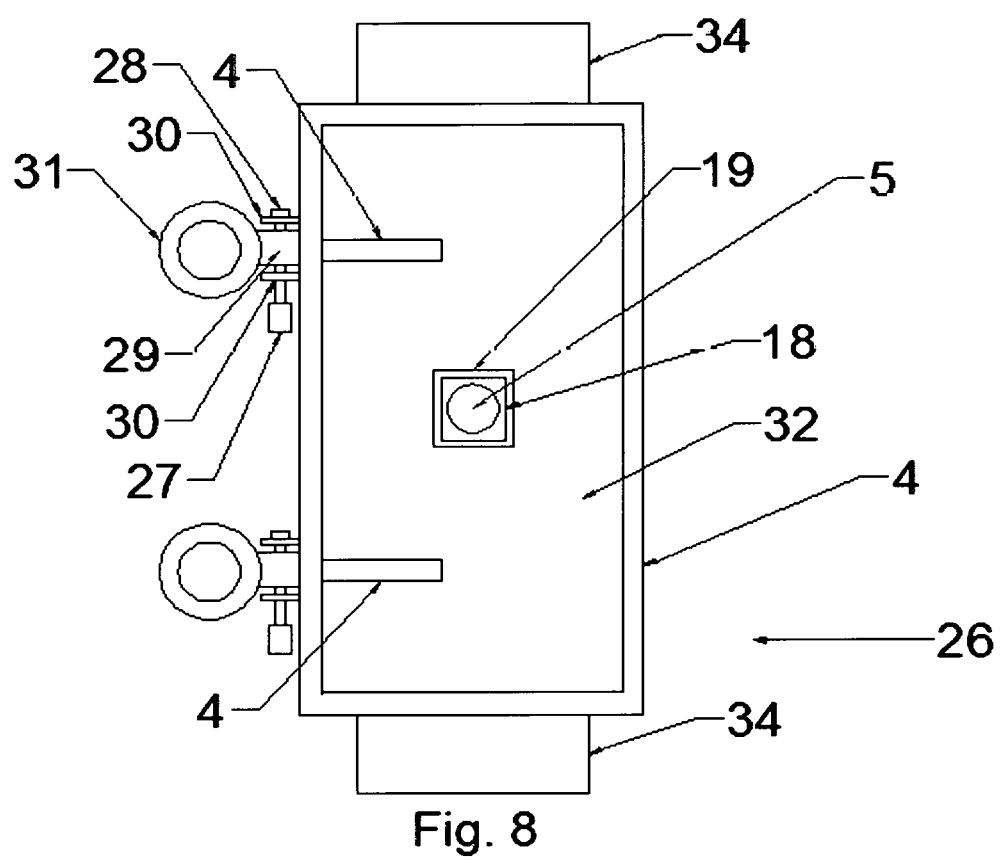
FIG. 8 is a top view of the embodiments tandem trailer dolly apparatus has a steel plate platform welded or bolted to the dolly frame. The adjustable ball hitch is attached to this platform. The tongue towing receivers adjustable trailer hitches framing mounts attach to the platform welded or bolted.

FIG. 8 discloses embodiment 26, showing steel plate 32 is welded or bolted to frame 4. Here is clearly seen tow hitch sleeve 19, adjustable hitch 18, and ball hitch 5. The adjustable ball 5 hitch 18 make horizontal leveling easy for rear tandem trailer. The adjustable hitches 30 fastening pins 28 and locks 27, secure towing receivers 31 bases 29 to adjustable hitches 30. The adjustable towing receiver's 31 capability allow the tandem trailer dolly 26 to be horizontally leveled. The pintle hook towing receivers 31 are stationary allowing no side to side turning, the only rotation is up and down.

Figure 9:
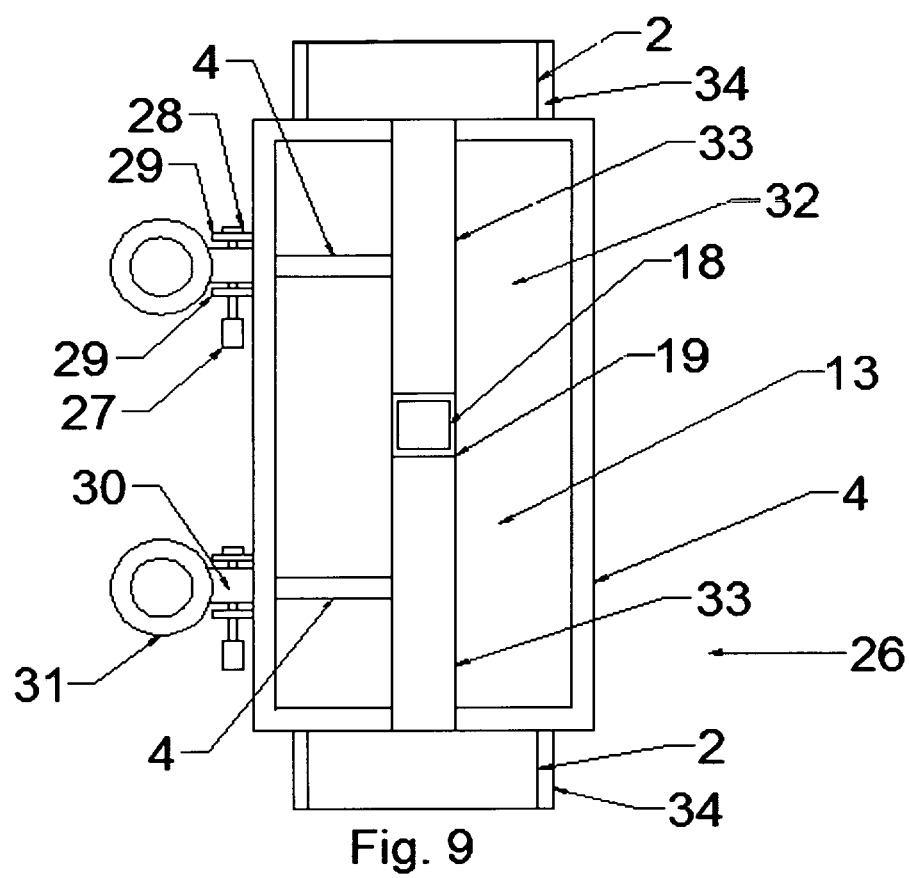
FIG. 9 is a bottom view of the embodiments tandem trailer dolly apparatus. Showing axle mounted to the frame with no suspension for absorbing bumps. The adjustable ball hitch sleeve is coaxial with the axle and at the midpoint center of the axle. The tongue towing receivers adjustable trailer hitches framing mounts attach to the platform welded or bolted.

FIG. 9 discloses embodiment 26, which shows how axle 33 is mounted to dolly frame 4 by means of welding or U-bolting. This axle 33 is square and at the axle 33 midpoint is hitch sleeve 19. This functioning hitch sleeve 19 passing through axle 33, has hitch sleeve 19 and axle 33 welded as one unit. By having hitch sleeve 19 welded to axle 33 attached by welding or U-bolts to steel plate 32. This way hitch sleeve 19 slides adjustable ball hitch 18 ball 5 down to the steel plate 32 platform or other heights up in an attempt to horizontal level towed rear tandem trailer.

While the invention has been described in connection with what is presently the most considered practical and preferred embodiment(s). It is to be understood that the invention is not limited to the disclosed embodiment(s) but, on the contrary is intended to cover various modifications and equivalent arrangements included within the scope of the appended claims.

What is claimed:

1. A tandem trailer dolly for towing a secondary trailer behind a primary trailer, wherein the tandem trailer dolly comprises:
    a dolly frame, an axle, and two ground engaging wheels;
    an adjustable trailer hitch extending from the dolly frame for connecting a rear end of the primary trailer for horizontal leveling of the tandem trailer dolly, the adjustable trailer hitch comprising a channel with a plurality of holes;
    a towing receiver with a base that is positioned in the channel of the adjustable trailer hitch and is adjustably coupleable to the adjustable trailer hitch;
    an adjustable ball hitch removably attachable to a ball hitch sleeve for pivotally connecting a tongue hitch of the secondary trailer to the tandem trailer dolly and for horizontal leveling of the secondary trailer; the ball hitch sleeve for pinning and locking of the adjustable ball hitch at different heights; the ball hitch sleeve being mounted coaxial to and at the midpoint of the axle to pivot the secondary trailer in tandem;
    a shock absorbing mechanism provided between the axle and the dolly frame to absorb shocks from the road;
    fenders provided to keep projectiles from hitting either the primary trailer or the secondary trailer.

2. The tandem trailer dolly of claim 1, wherein the shock-absorbing mechanism comprises leaf springs.

3. A tandem trailer dolly for towing a secondary trailer behind a primary trailer, wherein the tandem trailer dolly comprises:
    a dolly frame;
    an axle coupled to at least two ground engaging wheels;
    an adjustable ball hitch with a ball mount, the adjustable ball hitch comprising one or more holes, wherein the adjustable ball hitch pivotally connects a tongue hitch of the secondary trailer to the tandem trailer dolly and for horizontal leveling of the secondary trailer;
    a ball hitch sleeve for pinning and locking of the adjustable ball hitch at different heights, the ball hitch sleeve coupled to a plate, wherein the ball hitch sleeve passes through the plate and axle;
    wherein the adjustable ball hitch and ball hitch sleeve being mounted coaxial to
    and at the midpoint of the axle to pivot the secondary trailer in tandem.

4. The tandem trailer dolly of claim 3, further comprising a shock-absorbing mechanism.

5. The tandem trailer dolly of claim 4, wherein the shock-absorbing mechanism is coupled to the dolly frame via brackets and fasteners.

6. The tandem trailer dolly of claim 3, wherein the plate is coupled to an upper surface of the dolly frame that adds structural stability thereto.

7. The tandem trailer dolly of claim 3, wherein the one or more holes comprise a first cylindrical hole, a second cylindrical hole, and a third cylindrical hole.

8. The tandem trailer dolly of claim 7, wherein the first, second, and third cylindrical holes receive a pin that secures the adjustable ball hitch at different heights.

9. The tandem trailer dolly of claim 3, wherein the ball hitch sleeve comprises a pin hole.

10. The tandem trailer dolly of claim 3, wherein the ball hitch sleeve is welded to the plate.

11. The tandem trailer dolly of claim 3, further comprising a towing receiver with a base that couples to an adjustable trailer hitch.

12. The tandem trailer dolly of claim 11, wherein the adjustable trailer hitch comprises a channel to receive the base.

13. The tandem trailer dolly of claim 11, wherein the adjustable trailer hitch comprises a plurality of holes that receive a pin and a lock.

14. The tandem trailer dolly of claim 11, wherein the dolly frame secures the adjustable trailer hitch via a main arm, an upper arm, and a lower arm of the dolly frame.

15. The tandem trailer dolly of claim 3, wherein the axle is fastened to the frame with welding or U-bolts.

16. A tandem trailer dolly for towing a secondary trailer behind a primary trailer, wherein the tandem trailer dolly comprises:
    a dolly frame;
    an axle coupled to at least two ground engaging wheels;
    a shock-absorbing mechanism;
    a plurality of brackets and a plurality of fasteners that couple the shock-absorbing mechanism to the dolly frame;
    an adjustable trailer hitch with a channel;
    a receiver with a base that is positioned in the channel;
    a plate coupled to an upper surface of the dolly frame;
    an adjustable ball hitch with a ball mount, the adjustable ball hitch comprising one or more cylindrical holes, wherein the adjustable ball hitch pivotally connects a tongue hitch of the secondary trailer to the tandem trailer dolly and for horizontal leveling of the secondary trailer;
    a ball hitch sleeve for pinning and locking of the adjustable ball hitch at different heights, the ball hitch sleeve coupled to the plate, wherein the ball hitch sleeve passes through the plate and axle;
wherein the adjustable ball hitch and ball hitch sleeve being mounted coaxial to
and at the midpoint of the axle to pivot the secondary trailer in tandem.

17. The tandem trailer dolly of claim 16, wherein the ball hitch sleeve comprises a pin hole.

18. The tandem trailer dolly of claim 16, wherein the adjustable trailer hitch comprises a plurality of holes that receive a pin and a lock.

* * * * *